US006220963B1

(12) United States Patent
Meredith (10) Patent No.: US 6,220,963 B1
(45) Date of Patent: *Apr. 24, 2001

(54) COMPUTERIZED POOL CUE AND CONTROLLER

(76) Inventor: Christopher Meredith, 3 Whero La., Nantucket, MA (US) 02554

( * ) Notice: Subject to any disclaimer, the term of this patent is extended or adjusted under 35 U.S.C. 154(b) by 0 days.

This patent is subject to a terminal disclaimer.

(21) Appl. No.: 09/310,358

(22) Filed: May 12, 1999

Related U.S. Application Data (63) Continuation-in-part of application No. 08/903,100, filed on Jul. 30, 1997, and a continuation-in-part of application No. 09/176,825, filed on Oct. 22, 1998.

(51) Int. Cl.[7] .................................................. A63F 13/06
(52) U.S. Cl. ............................ 463/37; 273/148 B; 463/2
(58) Field of Search ................................ 463/2, 37, 47; 273/108.1, 112.3 R, 148 B; 473/2, 44, 45, 46

(56) References Cited

U.S. PATENT DOCUMENTS

| | | |
|---|---|---|
| D. 300,235 | 3/1989 | Nicotra . |
| D. 312,290 | 11/1990 | Rodriguez . |
| D. 354,106 | 1/1995 | Thompson . |
| 2,931,649 * | 4/1960 | Furda ..................................... 273/23 |
| 3,091,466 | 5/1963 | Speiser . |
| 3,508,440 | 4/1970 | Murphy . |
| 3,633,007 | 1/1972 | Sanders . |
| 3,633,008 | 1/1972 | Sanders . |
| 4,053,153 * | 10/1977 | Josenhans .............................. 273/23 |
| 4,086,630 | 4/1978 | Speiser et al. . |
| 4,954,817 | 9/1990 | Levine . |
| 5,066,008 | 11/1991 | Rivera . |
| 5,175,534 | 12/1992 | Thatcher . |
| 5,181,718 | 1/1993 | Valentine . |
| 5,195,744 | 3/1993 | Kapp et al. . |
| 5,203,563 | 4/1993 | Loper, III . |
| 5,232,223 * | 8/1993 | Dornbusch ....................... 273/148 B |
| 5,238,457 | 8/1993 | Triplett . |
| 5,295,682 | 3/1994 | Leonard . |
| 5,317,336 * | 5/1994 | Hall ...................................... 345/164 |
| 5,362,069 | 11/1994 | Hall-Tipping . |
| 5,368,484 | 11/1994 | Copperman et al. . |
| 5,474,502 | 12/1995 | Brown . |
| 5,542,672 * | 8/1996 | Meredith ................................ 463/37 |
| 5,782,693 | 7/1998 | Jordon et al. . |
| 5,841,426 | 11/1998 | Dodson et al. . |
| 5,846,137 | 12/1998 | Tremblay . |
| 5,853,333 * | 12/1998 | Patterson .............................. 473/42 |

* cited by examiner

Primary Examiner—Valencia Martin-Wallace
Assistant Examiner—Julie Kasick
(74) Attorney, Agent, or Firm—Weingram & Associates, P.C.

(57) ABSTRACT

A combination pool cue stick and controller is provided which includes a housing adapted to move over a flat surface. The housing includes a receptacle member adapted to receive a pool cue, sensing means in the receptacle member to sense the position and movement of the pool cue, and circuit means receiving and processing this information for input into a computer having appropriate compatible software to display the effects of the pool cue activity.

20 Claims, 9 Drawing Sheets

COMPUTERIZED POOL CUE AND CONTROLLER

This application is a continuation-in-part of U.S. Ser. No. 08/903,100 filed Jul. 30, 1997 and related Ser. No. 09/176,825 filed Oct. 22, 1998.

SPECIFICATION

BACKGROUND OF THE INVENTION

1. Field of the Invention

The present invention relates to computer pool games and in particular, to a computerized pool cue and controller to simulate the action and feel of using a pool cue.

2. Description of the Related Art

Devices and systems are known to simulate leisure activities such as golf, pool or billiards and fishing. For example,

| U.S. Pat. No. | Inventor (s) |
|---|---|
| 3,091,466 | Speiser |
| 3,508,440 | Murphy |
| 3,633,007 | Sanders |
| 3,633,008 | Sanders |
| 4,086,630 | Speiser, et al. |
| 5,066,008 | Rivera |

U.S. Patent No. 3,091,466 to Speiser discloses a computer-type golf game which consists of an impact screen element and photocell units. Upon impact of a golf ball upon the screen, the screen is distorted from its normally planar condition to permit at least one of the photocell units to generate a signal which will indicate the completion of flight of the golf ball.

U.S. Pat. No. 3,508,440 to Murphy discloses a golf game consisting of a detecting means for when the ball has been hit from a tee and a location means for determining when the ball has reached a predetermined locale, and a computing means for providing information relative to the trajectory of the flight of the ball hit from the tee.

U.S. Pat. No. 3,633,007 to Sanders discloses a golf game computer having an improved drag circuit to provide a representation of the instantaneous velocity of the golf ball.

U.S. Pat. No. 3,633,008 to Sanders discloses a golf game computer having a bounce and roll generator.

U.S. Pat. No. 4,086,630 to Speiser et al. discloses a computer type golf game having a visible fairway display, whereby attained yardage as indicated by the computer activates the progression of slides to a projection position to simulate a different area on the fairway.

U.S. Pat. No. 5,066,008 to Rivera discloses an electronic voice and control system for billiards which keeps score and is connected to audio and visual input/output elements. The system includes sensors at each of the pockets of the billiard table and open switches designed to close when a ball enters a particular pocket so that various aspects, players scores, "scratch", etc., can be indicated. In a preferred embodiment, each one of the object balls is coated with a magnetic material so that a magnetic sensing means can sense when the particular ball has entered a pocket.

In addition, a fishing rod and reel electronic game controller is disclosed in my U.S. Pat. No. 5,542,672 which issued Aug. 6, 1996.

Among the known devices and systems, there is no disclosure of a pool cue in combination with a joy stick and mouse to provide a user with the "feel" of the resistance encountered when using a pool cue.

OBJECTS AND SUMMARY OF THE INVENTION

It is an object of the present invention to provide a computerized pool cue and controller for a user to play a game of pool or billiards (hereinafter referred to as "pool") and experience the feel of actually using the pool stick through software simulation. The actual motion of the pool stick provides the simulation of playing a game of pool and signals the results of a cue stroke by software simulation.

It is another object of the present invention to provide a device which permits the user to move the pool cue and select different forms of "English" to be applied to a pool ball.

It is another object of the present invention to provide the controller as a modification of a computer mouse.

It is another object of the present invention to provide a computerized pool cue and controller which uses standard mouse and keyboard commands to control the software for the system.

A preferred embodiment of the invention includes a housing adapted to move over a flat surface, the housing including a stalk extending upwardly from the housing and supporting a tapered tubular or ring-like member adapted to receive a pool cue, sensing means in the housing, the stalk and the tubular member to sense the position and movement of the pool cue and send this information to circuitry which processes the information for input into a computer, which in turn uses appropriate compatible software to display the effects of the pool cue activity.

BRIEF DESCRIPTION OF THE DRAWINGS

For a more complete understanding of the present invention, reference may be had to the following detailed description of the preferred embodiments taken in connection with the drawings, of which:

FIGS. 6–12 include views of a second embodiment of the pool cue controller according to the present invention, of which:

FIGS. 13 (shown over FIGS. 13A and 13B) and 14 (shown over FIGS. 14A and 14B) are schematics for the pool cue controller according to the present invention.

DETAILED DESCRIPTION OF THE PREFERRED EMBODIMENTS

Figure 1:
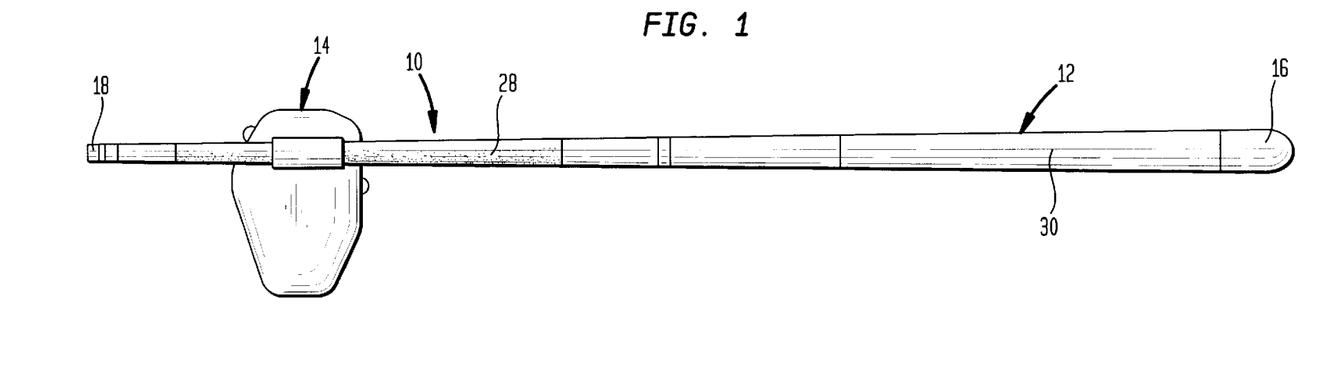
FIG. 1 is a top plan view of a computerized pool cue mounted for use with a controller according to the present invention.
Figure 2:
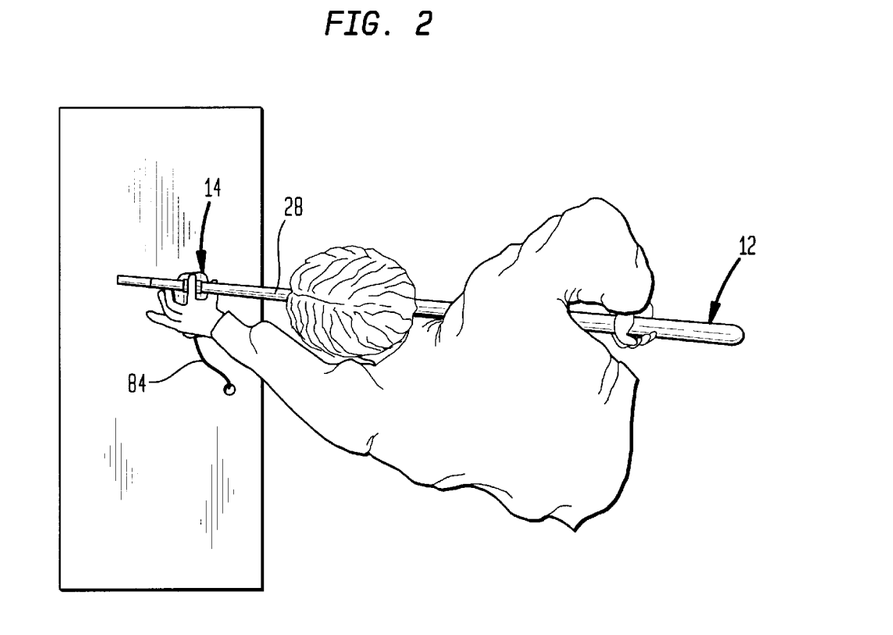
FIG. 2 is a top plan view of the computerized pool cue and controller of the present invention being used for a game of pool.

The present invention indicated generally at 10 includes a computerized cue stick 12 (hereinafter "cue") and a controller 14 as shown in FIGS. 1 and 2. The mounting of the cue 12 with the controller 14 and the coaction therewith is shown in FIG. 1. FIG. 2 shows the hand and finger placement employed to use the present invention. As shown in FIG. 2, it is apparent how similar the grasping and manipulation of the cue 12 and controller 14 resembles actually holding a cue stick and supporting it with the opposite hand to effect a pool "shot". FIGS. 3–5C show with more particularity the elements of the computerized cue 12 and controller 14 according to the present invention.

Figure 3:
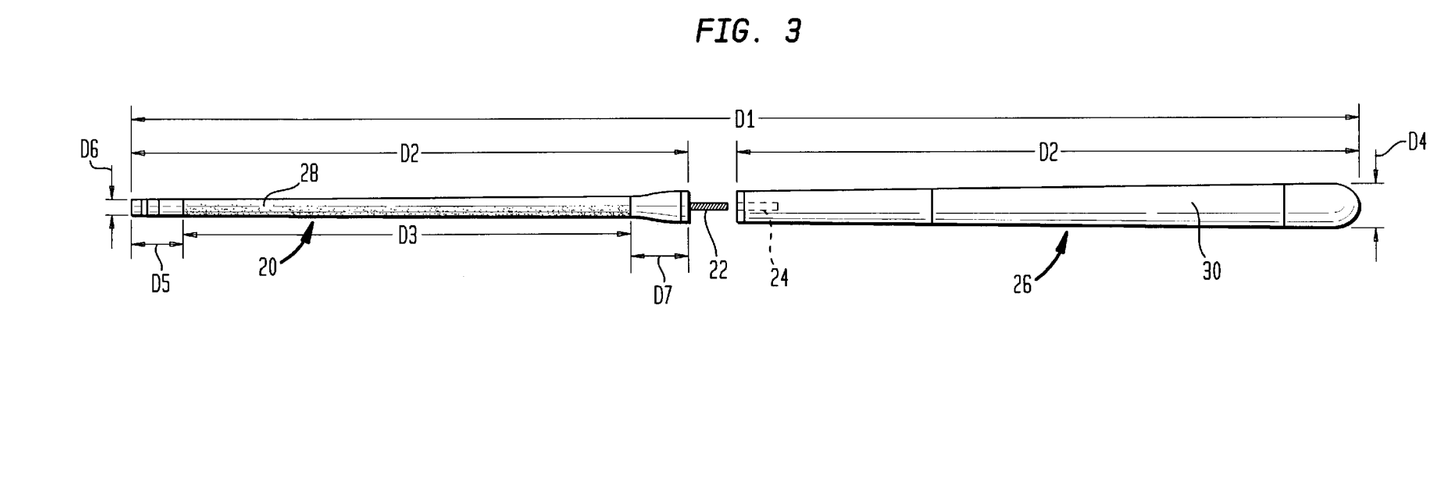
FIG. 3 is a partial cross sectional view of the pool cue according to the present invention.

FIG. 3 shows the cue 12 of the present invention. The cue 12 is constructed to be of regulation length, although the cue can be constructed to other lengths depending upon the arm length and "reach" of the user. The cue 12 is manufactured from known materials, such as wood, plastic or graphite components. The cue tapers from an end 16 or butt portion toward a tip 18 to contact a pool ball (not shown).

The cue 12 can be constructed as two separate portions with a forward portion 20 having a threaded bolt 22 to releasably engage a threaded insert 24 of a rear portion 26. The bolt 22 is preferably at least 1½ inches long and ⅜" wide.

A coating 28 is applied to a select area of the forward portion 20. The coating 28 is similar to the rubber compound used to manufacture a ball of a computer mouse. The coating 28 extends continuously along the forward portion 20 of the cue 12 for a predetermined length. The rear 26 or gripping portion of the cue 12 is provided with the conventional rubber grip 30 to facilitate control of the cue stick 12 during game play.

The dimensions of the cue 12 in FIG. 3 are designed to accommodate the arm length of the user, with preferred dimensions as follows:

D1=38 inches
D2=19 inches
D3=17 inches
D4=1 inch
D5=1 inch
D6=½ inch
D7=1 inch

Other dimensions for the elements D1–D7 discussed above are also suitable for the invention.

Figure 4:
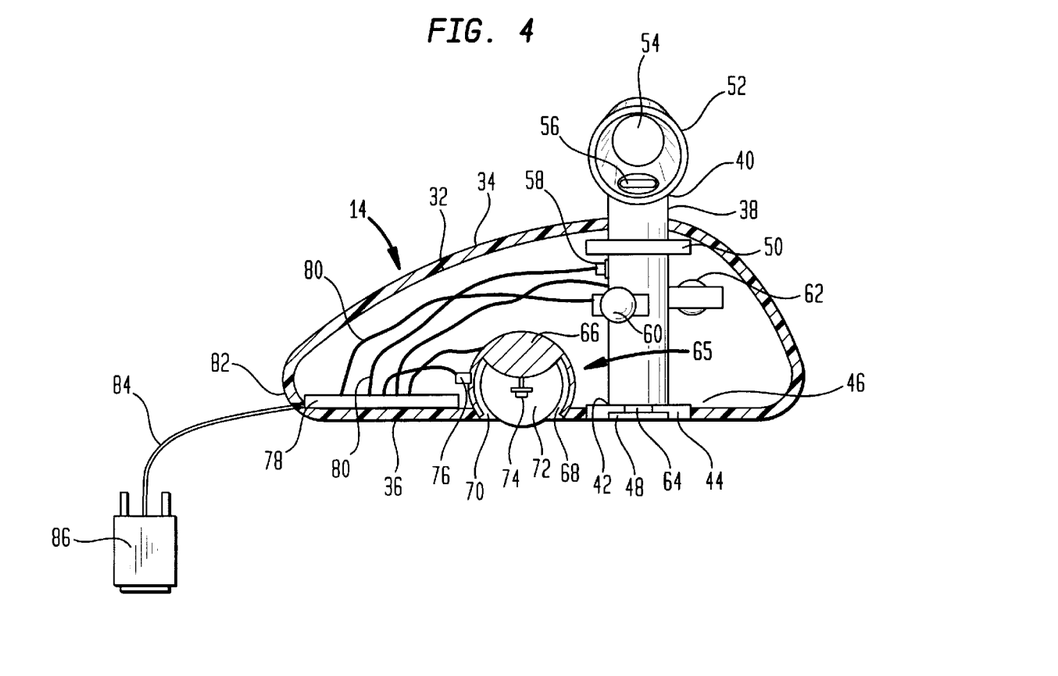
FIG. 4 is a partial cross sectional view of the controller according to the present invention.

Referring to FIG. 4, the controller 14 of the present invention is shown without the cue 12 mounted thereto. The controller 14 includes a case 32 to house elements of the controller 14. The case 32 is composed of plastic, light alloys or other composite materials, and has an upper surface 34 and a lower surface 36.

A stalk or arm 38 with opposed upper end 40 and lower end 42 extends through the case 32 from between the lower surface 36 and the upper surface 34, so that the upper end 40 protrudes from the upper surface 34 of the case 32. The stalk 38 is rotatably mounted within the case 32 with the lower end 42 seated in a mounting 44 at a bottom 46 of the case 32. A tension spring 48 is disposed at the mounting to contact and bias the stalk mount. A support 50 for the stalk is disposed at the interior of the case 32 to encircle an exterior surface of the stalk 38 proximate to where the stalk 38 protrudes from the upper surface 34 of the case 38. The support 50 also functions as a stop to prevent the stalk from being extracted from the housing.

A control ring 52 is mounted to the upper end 40 of the stalk 38. The control ring 52 includes a passageway 54 in which the cue 12 is received for reciprocating movement. A first optical reader 56 is mounted in the control ring 52 to sense movement of the cue 12 through the control ring 52. A second optical reader 58 is mounted to the exterior surface of the stalk 38 and is activated by the rotational movement of the stalk 38 about its longitudinal axis.

A first control button 60 is mounted to extend from a right or thumb side (see also, for example, FIG. 5B) of the case 32. A second control button 62 is mounted to a finger or left side (see also, for example, FIG. 5C) of the case 32. Referring to FIG. 4 a third control button 64 is mounted at the lower end 42 of the stalk 38 and is activated by pressure exerted on the tension spring 48 at the bottom 46 of the case 32.

Still referring to FIG. 4, a subassembly to signal further movement of the case 32 along the X and Y axis, and any angle therebetween, is generally indicated at 65 and arranged at the interior of the case 32. The subassembly includes a circumferentially shaped wall 66 forming a chamber 68 having an opening 70 in communication with an exterior of the case 32 at the bottom 46 of the case. A spherical member, such as a mouse ball 72 is rotatably mounted in the chamber 68, such that a portion of the ball 72 extends through the opening 70 to contact and support the case 32 for movement over an underlying surface (not shown). A third optical reader 74 is mounted to the circumferentially shaped wall 66 to generate signals responsive to movement of the mouse ball 72 along the X axis. A fourth optical reader 76 is also mounted to the circumferentially shaped wall 66 to generate signals responsive to movement of the mouse ball 72 along the Y axis.

A circuit board 78 is mounted at the interior of the case 32. Wiring 80 interconnects the circuit board 78 with the elements aforementioned. An aperture 82 is formed at a rear of the case 32 through which a lead 84 for a communications port plug 86 extends for connection to the circuit board 78.

Figure 5A:
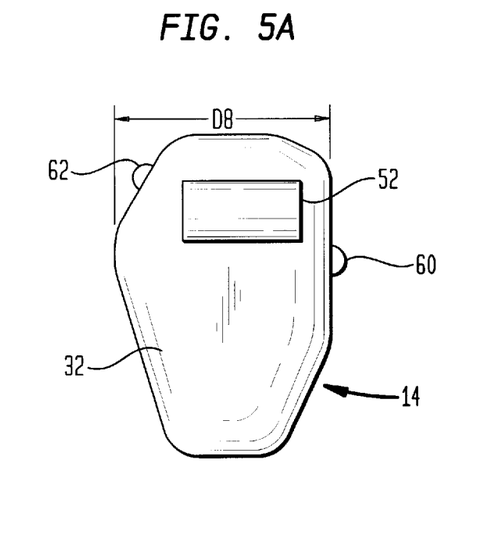
FIGS. 5A–5C are top, right and left side views, respectively, of the controller according to the present invention.
Figure 5B:
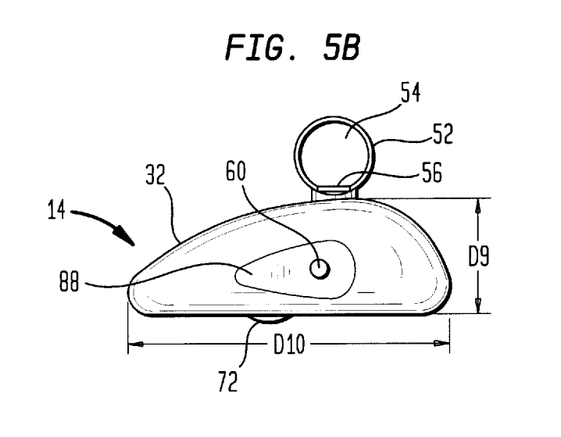
Figure 5C:
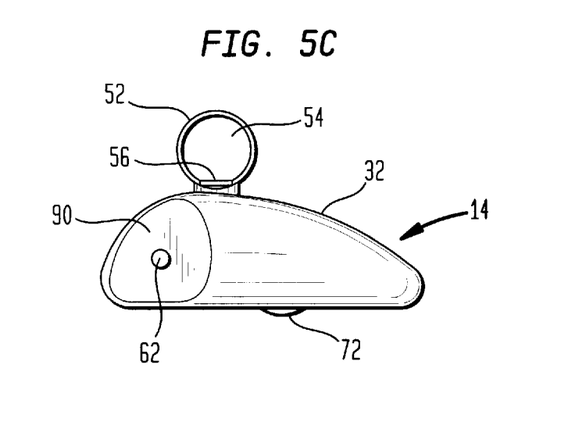
Figure 6:
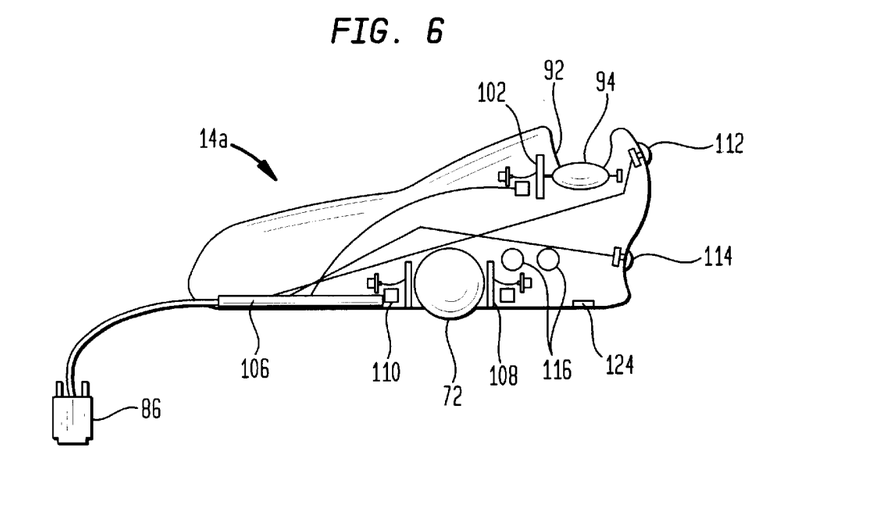
FIG. 6 is a generalized schematic representation of the pool cue controller.
Figure 7:
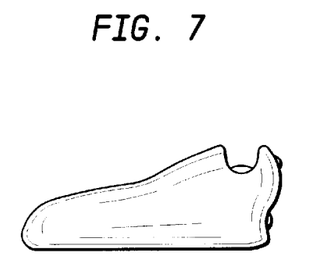
FIG. 7 is a right side elevational view thereof.

In FIGS. 5A–5C, views of the case 32 for the controller 14 according to the present invention are shown. The first and second control buttons 60,62 are shown, respectively, extending from their respective sides of the case 32. The right or thumb side of the case 32 in FIG. 5B is formed with a first depressed region 88 from which the first control button 60 protrudes for activation. The first depressed region 88 cradles the user's thumb and provides comfort when holding the case 32. The first region 88 permits the user to activate the first control button 60 with practically any portion of the thumb.

The finger or left side of the case (FIG. 5C) is similarly provided with a second depressed region 90 from which the second control button 62 protrudes for activation. The second depressed region 90 also provides for increased ergonomics and comfort for the user's fingers, as well, permitting a substantial portion of the user's finger to depress and actuate the second control button 90. The first and second control buttons 60,62 and control ring 52 enable simulation of the movement of the cue 12, as well as the "English" that the user can effect on the game ball.

Referring to FIGS. 5A and 5B, a preferred series of dimensions for the controller 14 are as follows:

D8=2½ inches
D9=1¼ inches

D10=3½ includes

Although the dimensions indicated for D8–D10 are preferred, other dimensions can be employed for the case 32 of the controller 14 of the present invention depending upon the size, strength and dexterity of the user's hand.

In operation, the cue 12 is fitted through the control ring 52 to activate the first optical reader 56. As the cue 12 is moved, the coating 28 contacts and activates the optical reader 56. The case 32 is grasped and moved along the X and Y axes, as well as movements therebetween, so that the user is in effect using a combination computer mouse and a joy stick. This permits the cue 12 to be tilted through a variety of angles to effect the necessary "English" to control the pool ball.

Figure 12:
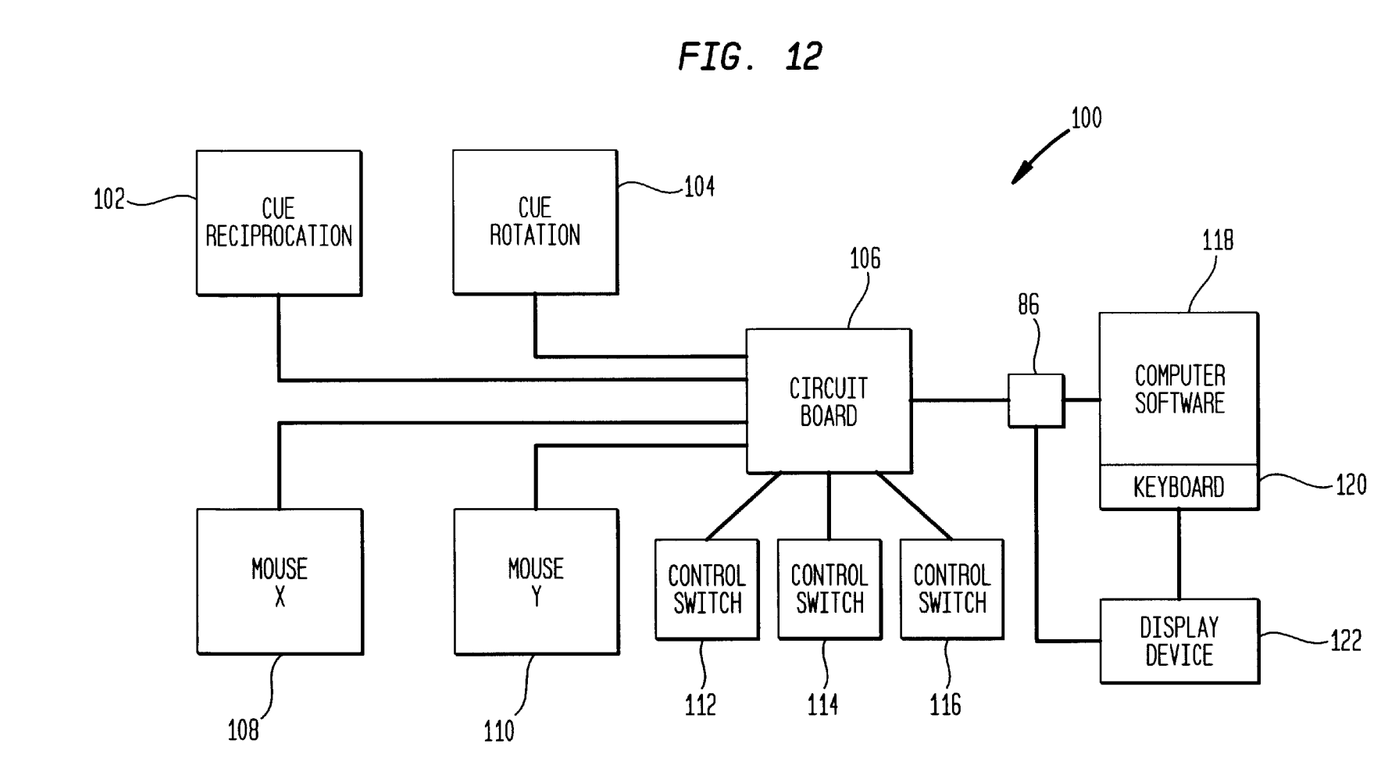
FIG. 12 is a block diagram of a system of operation of the present invention.

The user then observes a display device 122, shown in FIG. 12, such as a computer screen for the computer into which the plug 86 is connected. Movement of the case 32 along the X and Y axes translates into movement as shown on the computer screen with respect to game balls on the computer screen. As the user maneuvers the case 32 and the cue 12 associated therewith, the user views the computer screen to align the tip 18 of the cue 12 with respect to the ball to be hit, either off another ball or into a pocket of the pool game simulated on the computer screen. Movement of the cue 12 by the user through the control ring 52 is sensed by the optical reader 56 so that the user actually sees movement of the cue on the computer screen, and in particular, the tip 18 of the cue 12 with respect to the intended contact with a game ball.

The control ring 52 for the cue 12 and the third control switch 64 at the bottom 46 of the case 32, and the X and Y optical readers 56,58 are interconnected for coaction as follows. The first optical reader 56 in the control ring 52 is actuated when the control ring 52 is pushed downward against the surface underneath the case 32 to depress the third control switch 64 at the bottom 46 of the case 32. This action transmits a SHOOT command to the system software. As the third control switch 64 is being depressed, the X and Y optical readers 56,58 are disabled, i.e. since the user is performing a shot on the game ball, there is no reason that further movement would occur along the X and Y axis or any angle therebetween. After the SHOOT command, the user relieves the pressure on the control ring 52 so that the first and second (X and Y, respectively) optical readers 56,58 are again actuated for a subsequent shot at the game ball. Rotation of the stalk 38 is used as a fine adjustment for aiming the cue 12 prior to taking a shot. That is, after the case 32 is moved by the user with his hand to effect the optimum position for the cue 12 to contact the game ball, the stalk 38 is rotated to mimic the finite adjustments of the human wrist to perfect the shot.

When the second control button 62 at the finger side of the case 32 is depressed (the left mouse button), a ZOOM command is generated to the computer. When pressure is released from the second control button 62, aiming control is again available to the user.

Use of the computerized pool cue and controller of the present invention 10 provides the user with a "virtual pool" simulation incorporating standard mouse and keyboard commands to control the software.

Preferably, the control ring 52 for the cue 12, the stalk 38 and the third control button 64 will substitute for the control functions frequently used with the S key and X mouse movement as shown in the following chart. The preferable keyboard commands for controlling the system software for the invention with conventional keyboards is as follows:

| Keystroke | = | Command |
|---|---|---|
| A | | Aim Cue |
| S | | Shoot Ball |
| E | | Move Cue Tip on Ball (English) |
| Left Mouse Button Hold | | Zoom in and Out |
| B | | Raise Butt of Cue (Masse' Shots) |
| CTRL | | Toggle Fine Tune Aiming |
| V | | Change View |
| M | | Move Ball |
| C | | Move Center Point of View |
| X | | Snap to Overhead View |
| F | | Vary Tracking Force Lines |
| H | | Select Ball to Move |
| SHIFT | | Toggle Amplify (Used for First Rack Break) |
| L | | Toggle Table Lines ON/OFF |
| O | | Overhead View |
| R | | Replay Last Shot |
| T | | Tracking Lines |
| U | | Undo |
| Z | | Zip to Results |
| ESC | | Main Menu |

FIGS. 6–11 show a second embodiment 14a of the pool cue controller. The controller 14a is ergonomically shaped to facilitate gripping and accurate shooting of the pool cue 12 and provides for a comfortable grip of the device. The controller 14a includes many of the elements of the controller 14 and operates in a similar manner.

FIG. 12 represents a system block diagram 100 for the invention which includes optical reader elements that provide for cue reciprocation 102 and rotation 104. A circuit board 106 interconnects elements 102,104 for cue reciprocation and rotation, respectively, with mouse X 108 and mouse Y 110 ball movements. Control switches 112,114,116 are connected to the circuit board 106. Computer software 118 connected to the circuit board 106 is controlled at a keyboard 120. A display device 122 such as a computer monitor is connected to the computer software 118.

Figure 8:
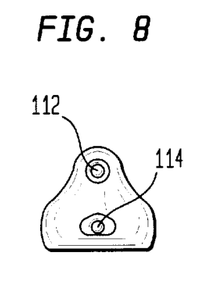
FIG. 8 is a front view thereof.
Figure 9:
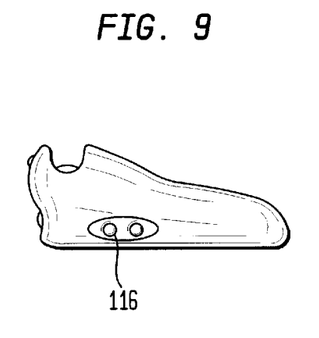
FIG. 9 is a left side elevational view thereof.
Figure 10:
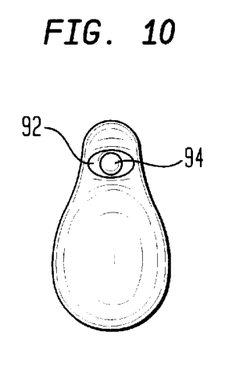
FIG. 10 is a top plan view thereof.
Figure 11:
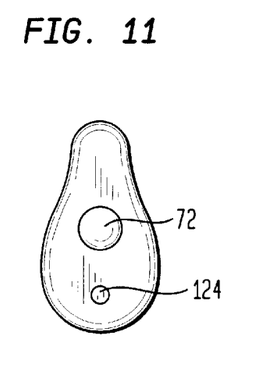
FIG. 11 is a bottom plan view thereof.

As shown in FIGS. 6–11, the pool cue stick slides over a slot 92 in the upper controller. Mounted inside of the base of the controller slot is an optical reader roller 94. The pool cue coated surface 28 slides over this roller which sends a rotation signal 104 to the computer software simulation 118 through circuit board 106 and communications port plug 86. Various microswitch buttons are programmed to control several software functions. The two control switch buttons 112,114 mounted on the front of the controller, FIG. 8, are actuated by the forefinger or thumb for stroking the cue stick to obtain reciprocation signal 102. When either is depressed, the normal mouse ball optical readers 108 and 110 on the bottom of the controller are disabled and the slot optical reader is enabled. The other two buttons 116 on the left side, FIG. 9, allow the user to control table zoom in and out and cue tip rotation allowing different types of English or spin. Underneath the controller is a recessed switch 124, FIG. 11, that allows the user to reverse the optical reader to enable both left and right handed players to use the controller.

Figure 13A:
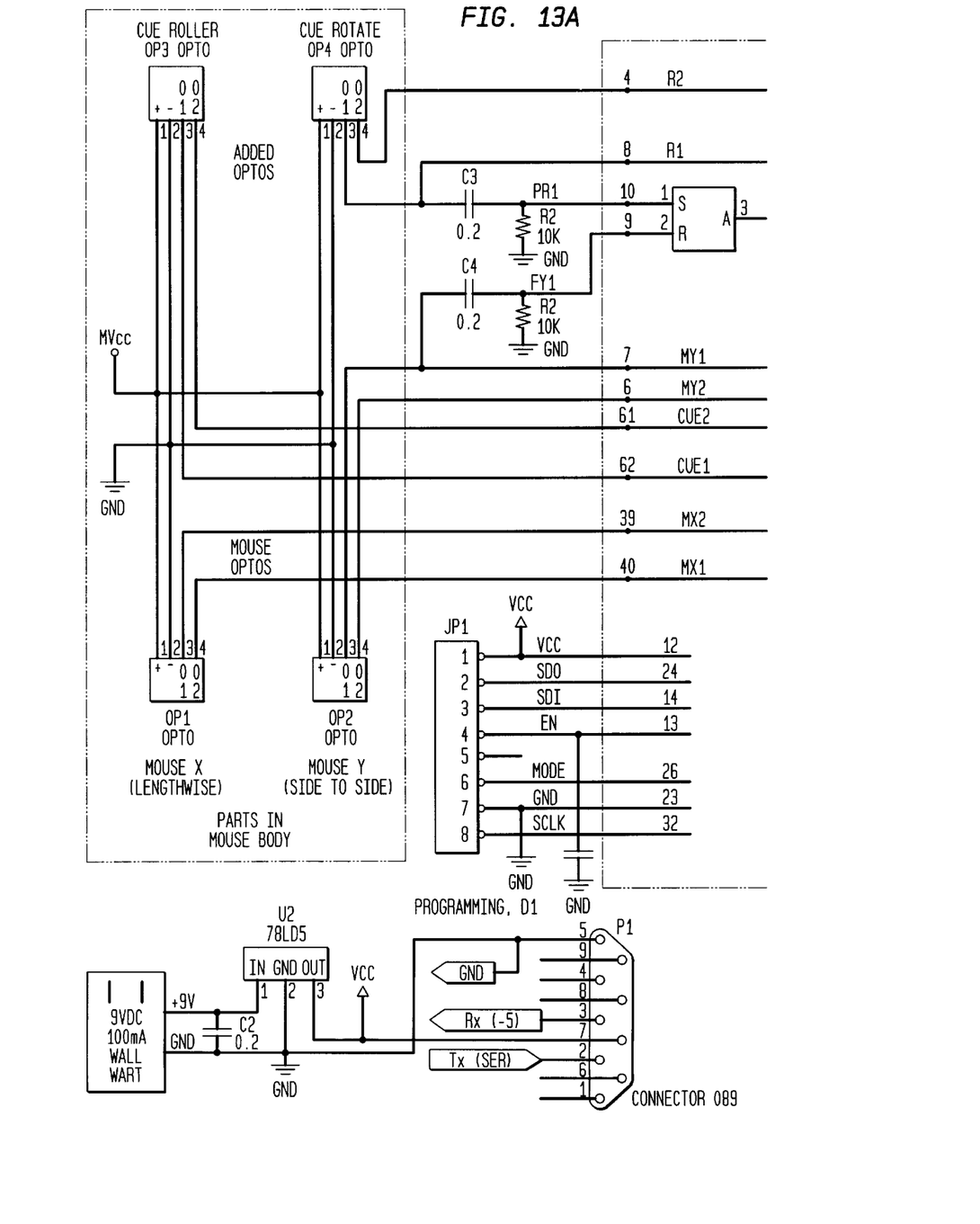
Figure 13B:
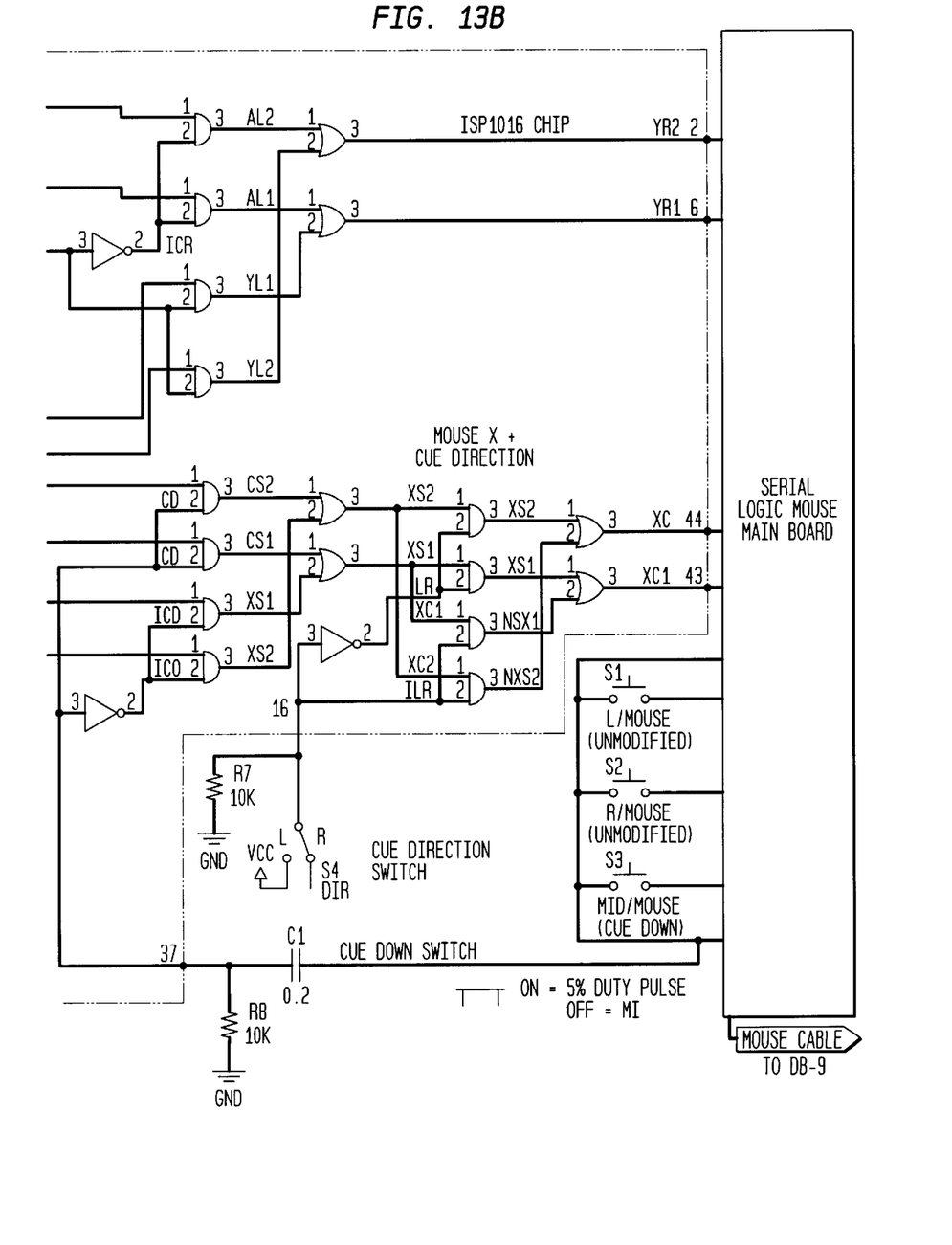
Figure 14A:
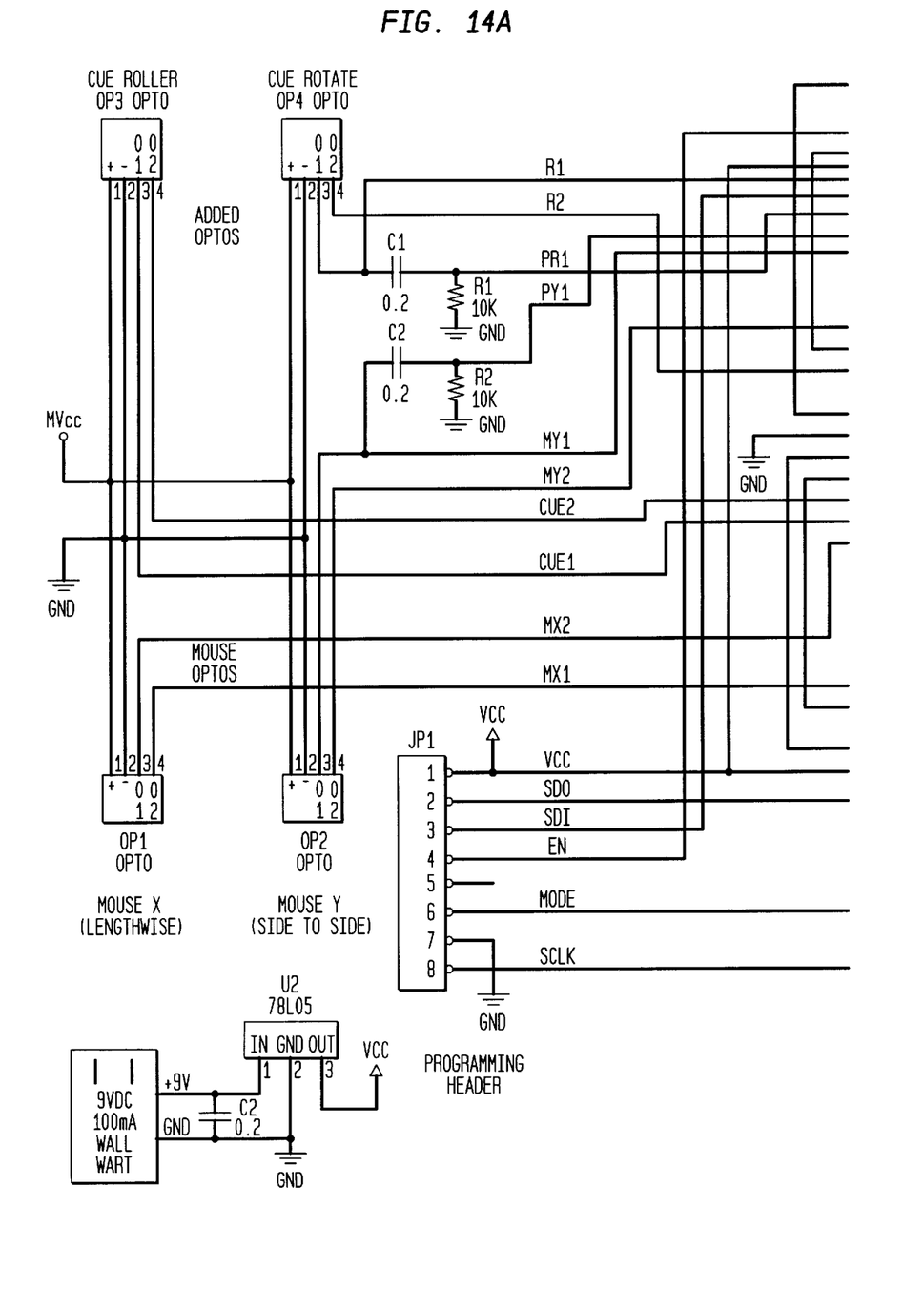
Figure 14B:
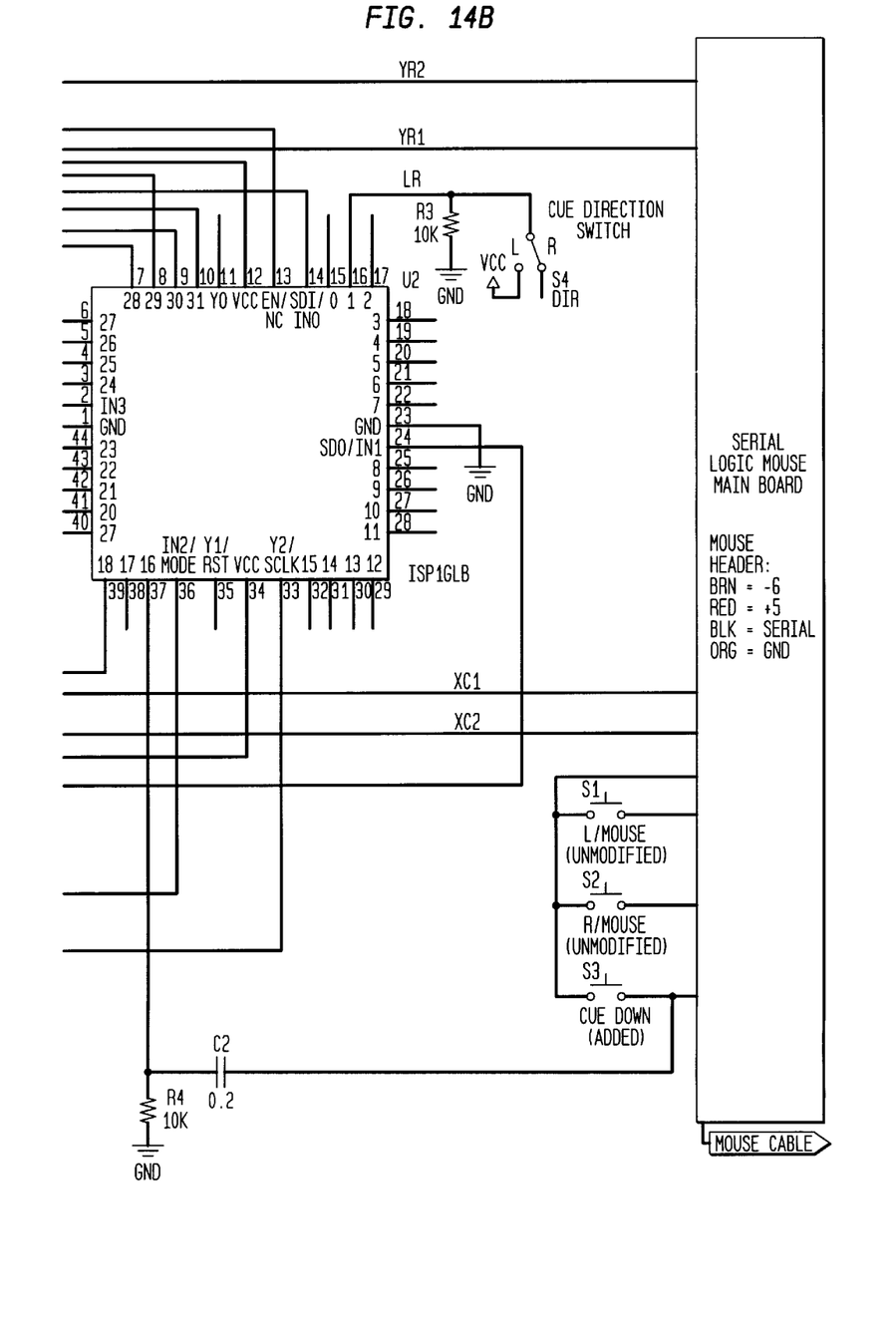

FIGS. 13 and 14 show schematic representations of the wiring for the pool cue controller 10 according to the present invention.

The present pool cue stick and cue controller thus modifies standard mouse technology to provide a product having a real feel of the game of pool. The user can play the pool software simulation with the true motions employed in playing the actual game of pool.

It will be understood that the embodiments described herein are merely exemplary and that a person skilled in the art may make many variations and modifications without departing from the spirit and scope of the invention. All such modifications and variations are intended to be included within the scope of the invention as defined by the claims herein.

What is claimed is:

1. An electronic controller apparatus and cue stick for pool or billiard simulation games, comprising:

a housing adapted to move over an underlying surface and having:
   a top,
   a bottom,
   sidewalls interconnecting said top with said bottom for providing said housing with an interior space, a stalk rotatably mounted within said interior space of said housing, said stalk having an upper end extending from the top of said housing, and a lower end terminating within said interior space of said housing proximate said bottom of said housing;

a first support member disposed in said interior space at said bottom of the housing to support the lower end of said stalk;

a second support member disposed within said interior space near said top of said housing to support said upper end of said stalk;

a control receptacle mounted to said upper end of said stalk;

a cue stick having a coating of rubber compound along a portion of an exterior surface thereof, said cue stick constructed and arranged for movement within and in contact with said control receptacle;

a first sensor assembly mounted to said upper end of said stalk and exposed to said control receptacle for generating a signal responsive to movement of said cue stick in contact with said receptacle;

a second sensor assembly mounted to an exterior surface of said stalk for generating a signal responsive to rotational movement of said stalk about a longitudinal axis of said stalk;

a first control button extending from a sidewall at a first region of said housing between said top and bottom of said housing;

a second control button extending from a sidewall at a second region of said housing between said top and bottom of said housing;

a spring supported by said first support member for coaction with said lower end of said stalk for biasing said stalk in a direction parallel to the longitudinal axis of said stalk;

a mouse ball disposed within said interior space of said housing, a portion of said mouse ball extending through said bottom of said housing to contact said underlying surface;

a third sensor assembly mounted within said interior space of said housing for generating a signal responsive to movement of said mouse ball along said underlying surface;

a circuit board disposed within said interior space of said housing;

means for interconnecting said circuit board with said stalk, said control receptacle, said first, second and third sensor assemblies, and said first and second control buttons; wherein movement of said stalk, mouse ball, cue stick, and first and second control buttons generates signals to said circuit board with information about movement of said cue stick for display of the effects of cue stick movement.

2. An electronic controller apparatus for controlling pool or billiard simulation games, comprising:

a housing adapted to move over an underlying surface;

a control support extending upwardly from said housing and having:
   an upper support portion adapted to receive a cue stick;
   sensing means disposed in said housing within said upper support portion for sensing the position and movement of said cue stick; and circuit means within said housing for processing information, said sensing means providing information of said position and movement of said cue stick to said circuit means, said circuit means processing said information for input into a display device for display of the effects of cue stick movement.

3. The electronic controller apparatus according to claim 2, wherein said housing further comprises:

a first region at a first side of the housing between an upper surface and a lower surface of the housing, a second region at a second side of the housing between said upper and lower surfaces and substantially opposite to said first region, a first switch extending from said first region at said first side of said housing, said first switch adapted to transmit a signal indicating contact of an end of said cue stick on a select area of a game ball, and a second switch extending from said second region at said second side of said housing, said second switch adapted to transmit a signal representing movement of said end of said cue stick towards and away from said game ball.

4. The electronic controller apparatus according to claim 3, wherein said control support comprises:

a lower portion opposite to said upper portion and disposed within an interior of the housing, a receptacle within said upper portion of said control support for receiving said cue stick, and a support member disposed within said interior of said housing proximate the lower surface of the housing for supporting said lower portion of said control support.

5. The electronic controller apparatus according to claim 3, further comprising:

a third switch disposed at said lower portion of said control support for actuation by depressive force exerted on said control support.

6. The electronic controller apparatus according to claim 2, wherein said sensing means comprises:

a first sensor assembly mounted to said upper support portion of said first control means for sensing movement of said cue stick in contact with said first sensor, a second sensor assembly mounted to said housing for sensing the rotational movement of said first control means, and a third sensor assembly mounted to said housing for sensing movement of said housing along said underlying surface.

7. The electronic controller apparatus according to claim 6, wherein said second and third sensor assemblies are mounted within said interior of said housing.

8. The electronic controller apparatus according to claim 7, wherein said cue stick comprises:

a coating of rubber compound along a portion of an exterior surface of said cue stick for coaction with said first sensor assembly.

9. The electronic controller apparatus according to claim 2, further comprising:

means for interconnecting said control support and said sensing means.

10. A device for simulating the play of a game of pool and the action and feel of the use of a pool cue stick comprising:
a housing adapted to move over an underlying surface, said housing including a top, a bottom and sidewalls connected together to provide an interior space;
a receptacle at the upper end of said housing;
first optical sensing means secured within said receptacle, said first optical sensing means generating a signal upon movement of a cue stick thereover;
a rotatable ball mounted on the bottom of said housing and extending therethrough for rotatable movement along said underlying surface;
second and third optical sensing means mounted adjacent to said ball for generating signals responsive to movement of said ball along respective X and Y axes of said underlying surface;
electrical circuit means within said housing connected to said first, second, and third optical sensing means for receiving the signals therefrom; and
means connected to said circuit means for communicating said signals to external utilization apparatus.

11. The device according to claim 10 including a first control switch means mounted on the bottom of said housing operative to disable said second and third optical sensing means upon depression of said first control switch means for applying a first control signal to said external utilization apparatus.

12. The device according to claim 11 including second and third control switch means mounted on opposite outer sides of said housing and connected to said circuit means for communicating second and third control signals to said external utilization apparatus.

13. A device for simulating the play of a game of pool and the action and feel of the use of a pool cue stick comprising:
a housing adapted to move over an underlying surface;
an interior space disposed in said housing;
translation means to enable movement of the housing over an underlying surface;
sensing means in said housing adapted to sense movement of the housing;
signal generating means in said housing adapted to generate a signal in relation to said sensing means to indicate movement of said housing over an underlying surface;
cue receptacle means operatively associated with the housing adapted to receive a pool cue stick;
cue sensing means operatively associated with said cue receptacle means to sense movement of a pool cue stick associated with said receptacle means and generate a signal in relation to said cue sensing means to indicate movement of a pool cue stick in relation to said cue receptacle means, and
circuit means within said housing receiving and processing said signal indicating pool cue stick movement for communication to an external display device.

14. The device according to claim 13 wherein said cue receptacle means includes a slot disposed on an upper surface of said housing, said cue sensing means includes an optical reader roller within said slot engageable with said cue stick and generating a signal of rotation to said circuit means.

15. The device according to claim 14 wherein said translation means includes a rotatable ball mounted on and extending through the bottom of said housing, and optical axis reader sensing means mounted adjacent said ball for generating signals responsive to movement of said ball along respective x and y axes of said underlying surface.

16. The device according to claim 15 including an optical reader within said slot and a pair of microswitch buttons on a front housing surface, wherein depression of said buttons disables said optical axis sensing means and enables said slot optical reader, said optical reader sensing reciprocal stroking movement of said cue stick.

17. The device according to claim 16 including a pair of microswitch buttons on a side housing surface for control of table zoom in and out and cue tip spin rotation.

18. The device according to claim 17 including a plug connected to said circuit means for connection to said external display device.

19. The device according to claim 18 including a recessed switch or the bottom of the housing for reversal of the optical reader enabling use by left and right handed players.

20. A device for simulating the play of a game of pool and the action and feel of the use of a pool cue stick comprising:
a housing adapted to move over an underlying surface;
an interior space disposed in said housing;
translation means to enable movement of the housing over an underlying surface;
sensing means in said housing adapted to sense movement of the housing;
signal generating means in said housing adapted to generate a signal in relation to said sensing means to indicate movement of said housing over an underlying surface;
cue receptacle means operatively associated with the housing adapted to receive a pool cue stick;
cue sensing means operatively associated with said cue receptacle means to sense movement of a pool cue stick associated with said receptacle means and generate a signal in relation to said cue sensing means to indicate movement of a pool cue stick in relation to said cue receptacle means; and
circuit means within said housing receiving and processing said signal indicating pool cue movement for communication to an external display device, wherein said cue receptacle means includes a slot disposed on an upper surface of said housing, said cue sensing means includes an optical reader roller within said slot engageable with said cue stick and generating a signal of rotation to said circuit means;
said translation means includes a rotatable ball mounted on and extending through the bottom of said housing, and optical axis reader sending means mounted adjacent said ball for generating signals responsive to movement of said ball along respective x and y axes of said underlying surface;
an optical reader within said slot and a pair of microswitch buttons on a front housing surface, wherein depression of said buttons disables said optical axis sensing means and enables said slot optical reader, said optical reader sensing reciprocal stroking movement of said cue stick;
a pair of microswitch buttons on a side housing surface for control of table zoom in and out and cue tip spin rotation;
a plug connected to said circuit means for connection to said external display device; and
a recessed switch on the bottom of the housing for reversal of the optical reader enabling use by left and right handed players.

* * * * *